(12) United States Patent
Fernandez et al.

(10) Patent No.: US 7,726,592 B2
(45) Date of Patent: Jun. 1, 2010

(54) PROCESS FOR INCREASING THE REFINER PRODUCTION RATE AND/OR DECREASING THE SPECIFIC ENERGY OF PULPING WOOD

(75) Inventors: Eric Oswaldo Fernandez, Jacksonville, FL (US); Mark Edward Laurint, Jacksonville, FL (US)

(73) Assignee: Hercules Incorporated, Wilmington, DE (US)

(*) Notice: Subject to any disclaimer, the term of this patent is extended or adjusted under 35 U.S.C. 154(b) by 1529 days.

(21) Appl. No.: 11/002,594

(22) Filed: Dec. 2, 2004

(65) Prior Publication Data

US 2005/0133643 A1 Jun. 23, 2005

Related U.S. Application Data

(60) Provisional application No. 60/614,170, filed on Sep. 29, 2004, provisional application No. 60/527,121, filed on Dec. 4, 2003.

(51) Int. Cl.
*B02C 23/06* (2006.01)
*B02C 1/00* (2006.01)
*B27L 11/02* (2006.01)

(52) U.S. Cl. .............................. 241/16; 241/21; 241/28

(58) Field of Classification Search .................... 241/15, 241/16, 21, 22, 28
See application file for complete search history.

(56) References Cited

U.S. PATENT DOCUMENTS

| 2,947,655 | A |   | 8/1960  | Eberhardt ..................... 162/26 |
|-----------|---|---|---------|----------------------------------------|
| 3,676,247 | A | * | 7/1972  | Morris et al. ................ 156/205 |
| 3,808,090 | A |   | 4/1974  | Logan et al. .................. 162/23 |
| 4,388,148 | A |   | 6/1983  | Yahrmarkt et al. ............ 162/26   |
| 4,767,499 | A |   | 8/1988  | Simonson et al. ............. 162/25   |
| 4,917,835 | A | * | 4/1990  | Lear et al. .................. 264/29.1 |
| 5,007,985 | A |   | 4/1991  | Engstrand et al. ............. 162/26  |
| 5,200,457 | A | * | 4/1993  | Vasishth et al. ............. 524/437  |
| 5,338,405 | A |   | 8/1994  | Patt et al. ...................... 162/25 |
| 5,454,907 | A |   | 10/1995 | Hayashi ....................... 162/26 |
| 6,159,335 | A |   | 12/2000 | Owens et al. .................. 162/9  |

OTHER PUBLICATIONS

Strand, B.C.; Mokvist, Anders; Faluk: Bo; and Jackson, Michael. "The Effect of Production Rate on Specific Energy Consumption in High Consistency Chip Refining". IPMC Conference, Oslo, 1993. Jun. 2, 2005. pp. 1-11. <http://www.pacsim.com/Articles/Specener/Specific_Energy.shtml>.

Rying, Sverre, "Groundwood Mills Use Specialty Chemicals to Solve Pitch Problems", Pulp & Paper, Trevose, PA, 1978, pp. 177-179.

* cited by examiner

*Primary Examiner*—Dana Ross
*Assistant Examiner*—Debra M Sullivan
(74) *Attorney, Agent, or Firm*—Joanne Mary Fobare Rossi

(57) ABSTRACT

The present invention relates to processes for enhancing a refiner's production rate and/or reducing the specific energy consumption for a freeness target through the use of lubricant(s) or carrier(s)/frictionizer(s), respectively.

16 Claims, No Drawings

PROCESS FOR INCREASING THE REFINER PRODUCTION RATE AND/OR DECREASING THE SPECIFIC ENERGY OF PULPING WOOD

This application claims the benefit of U.S. Provisional Application No. 60/614,170, filed Sep. 29, 2004, and U.S. Provisional Application No. 60/527,121, filed Dec. 4, 2003, each of which is hereby incorporated herein by reference in its entirety.

FIELD OF THE INVENTION

The present invention relates to the papermaking industry. In particular, the present invention relates to a process for enhancing a refiner's production rate and/or reducing the specific energy consumption for a freeness target.

BACKGROUND OF THE INVENTION

Generally, mechanical and/or chemical treatments of cellulosic plant substances (e.g. wood) are used in the papermaking process to generate pulp, the basis and raw material for making paper products. Pulp may be generated either chemically or mechanically by removing the cellulose fibers from the wood matrix, which typically occurs in a refiner. In the context of the paper and pulp industry, a "refiner" is a piece of equipment used to grind up wood, typically wood chips, between two rotating surfaces (e.g., rotating discs) having refiner plates attached thereto. In particular, a disc refiner uses two refiner plates for treating pulp and paper fibers in order to develop strength in the paper product made from such fibers. The fibers pass between two plates, one or both of which rotate and apply pressure to the fibers. Thus, the liberation of fibers from a wood matrix is commonly referred to as "refining".

The chemical treatment of wood, also referred to as chemical pulping, essentially uses chemicals in the digestion of wood where solutions of various chemicals eliminate or dissolve lignin, non-fibrous materials or other impurities to result in the generation of pulp. Mechanical treatment, also referred to as mechanical pulping, utilizes a grinding mechanism such as the above-described disc refiner to liberate fibers from a wood matrix, wherein the pulp is liberated via mechanical force rather than by chemical means.

Typical mechanical processing systems consist of several steps, including wood chipping and handling, mechanically sorting the wood chips, washing the chips, preheating or steaming (atmospheric or pressurized) of the chips, $1^{st}$ stage refining, an optional $2^{nd}$ stage refining (often multiple refining stages are used), latency removal, screening, bleaching, and storage before the pulp is sent to a paper machine.

As known in the art, mechanical pulping processes require the consumption of a significant amount of energy. There is a desire within the industry to reduce these energy requirements to generate the pulp necessary for the production of paper and paper additives. Attempts have been made in the art to reduce the energy demands of refiners, as described in U.S. Pat. No. 4,388,148 (Yahrmarkt et al.); U.S. Pat. No. 5,007,985 (Engstrand et al.); U.S. Pat. No. 5,338,405 (Paft et al.); U.S. Pat. No. 5,454,907 (Hayashi) and U.S. Pat. No. 6,159,335 (Owens et al.).

Another method of realizing energy savings is to increase the production rate of a refiner without increasing the specific energy consumption, as specified in the technical article titled "The Effect of Production Rate on Specific Energy Consumption in High Consistency Chip Refining", by Strand B. C. et al. IMPC Conference, Oslo 1993, p. 143-151. Thus, the refiner would provide a greater amount of pulp without a simultaneous increase in the specific energy consumption. There have been attempts within the industry to increase the production rate of a refiner, as is described in U.S. Pat. No. 3,808,090 (Logan et al.), however, such attempts have proven unsuccessful.

Additionally, the industry has noted the use of chemicals and/or secondary processes to treat the wood chips for greater ease of processing, for example, as described in U.S. Pat. No. 4,767,499 (Simonson et al.); U.S. Pat. No. 2,947,655 (Eberhardt); and a technical article titled "Groundwood Mills use Specialty Chemicals to Solve Pitch Problems" Pulp & Paper, by Rying, S., March 1978, p. 177-179.

The embodiments of the process provided by the present invention address the needs of the papermaking industry due to the enhancement of the refiner production rate and/or the reduction of the specific energy necessary for a freeness target. The embodiments of the present invention provide costs savings with respect to the number of refiners needed in a given process to produce a particular tonnage of pulp per day as well as a potential reduction in the energy consumption for the refining process.

Additionally, the embodiments of the present invention are advantageous because they do not pose a health risk to operators of the refiner because highly alkaline and toxic substances such as sodium aluminate are not used.

SUMMARY OF THE INVENTION

The embodiments of the present invention utilize a lubricant solution, or in the alternative, utilize a carrier/frictionizer solution to increase the production rate of a refiner with respect to wood chips and/or reduce the specific energy consumption for a target freeness.

An embodiment of the process comprises:
(a1) applying, by soaking and/or spraying, a lubricant solution to an amount of wood chips prior to delivery into a refining area; or
(a2) applying, by soaking and/or spraying, a carrier/frictionizer solution to an amount of wood chips prior to delivery into a refining area; and
(b) delivering the wood chips to a refiner.

An alternative embodiment of the present invention comprises (1) delivering an amount of wood chips to a refiner; and (2) applying, by soaking and/or spraying, a carrier/frictionizer solution to an amount of wood chips in the refining area.

Step (a1) involves applying an aqueous lubricant solution to an amount of wood chips, wherein the lubricant solution contains about 0.04 wt-% to about 15 wt-% of the lubricant, preferably the solution contains about 0.06 wt-% to about 9.0 wt-% of the lubricant; more preferably about 0.06 wt-% to about 2 wt-%, and most preferably, the solution is about a 1.0 wt-% aqueous lubricant solution.

The lubricant solution of step (a1) may be applied to the wood chips by any methods known in the art. In general, for any of the soaking or spraying application methods or combinations thereof, the lubricant dosage should be in the range of about 0.1 to about 6 pounds of lubricant per ton of wood chips, preferably ranging from about 0.25 to about 4 pounds of lubricant per ton of wood chips; and more preferably about 0.5 pounds of lubricant per ton of wood chips.

The lubricant solution of step (a1) may comprise cationic guar gum, cationic starch, cationic polyacrylamide, nonionic polyethylene oxide, mixtures containing xanthan gum and at least one other lubricant (preferably cationic guar gum); and/or various combinations or mixtures of the above-described lubricants.

Step (a2) involves applying an aqueous carrier/frictionizer solution to an amount of wood chips by any methods known in the art, such as soaking, spraying and combinations thereof. The carrier/frictionizer solution is applied to the wood chips, wherein the solution contains about 0.04 wt-% to about 15%-wt. of the carrier (based on the total weight of the carrier/frictionizer solution) and contains about 0.3 wt-% to about 30 wt-% of the frictionizer (based on the total weight of the carrier/frictionizer solution). Optimally the carrier/frictionizer solution contains about 0.5 wt-% of a carrier and about 3 wt-% of frictionizer (based on the total weight of the carrier/frictionizer solution).

The carrier/frictionizer dosage should be in the range of about 0.1 to about 10 pounds of carrier/frictionizer per ton of wood chips, preferably ranging from about 0.1 to about 6 pounds of carrier/frictionizer per ton of wood chips, and more preferably ranging from about 0.25 to about 4 pounds of carrier/frictionizer per ton of wood chips. Optimally the carrier/frictionizer solution contains about 0.5 pounds per ton of a carrier and about 3 pounds per ton of frictionizer (based on the total weight of the carrier/frictionizer solution).

The carrier for use in step (a2) comprises cationic guar gum, anionic guar gum, nonionic guar gum, amphoteric guar gum, cationic starch, nonionic polyethylene oxide, cationic polyacrylamides, anionic polyacrylamides, nonionic polyacrylamides, xanthan gum, mixtures of xanthan gum and at least one other carrier (preferably one of cationic/nonionic/anionic/amphoteric guar gum); and other various combinations of the above-described carriers.

Suitable frictionizers comprises aluminum oxide, pumice, calcium metasilicate (e.g. wollastonite), nepheline syenite, silica, feldspar, aluminum trihydrate, glass beads, quartz, clay and various mixtures of such frictionizers. Moreover, the frictionizer should not completely dissolve or react upon exposure to the various components utilized during the pulping process.

DETAILED DESCRIPTION

The embodiments of the present invention relate to processes for enhancing refiner production rate and/or reducing the specific energy consumption for a freeness target.

Typical processes for pulping are those where the wood chips are fed into a refiner, such as those conventional refiners known by those skilled in the art (e.g. a KRK 12 inch TMP pressurized primary refiner, model number BRP55-300SS, manufactured by Kumagai Riki Kogyo Company Ltd, Tokyo Japan). The refiner is utilized to reduce the cellulosic raw materials that are suspended in water to a fibrous state (the wet pulp material).

Generally, the wood chips in a refiner are initially contained in a pre-heated vessel and subsequently fall into a ribbon feed screw that is pressurized at the same pressure as the refiner. The wood chips are continuously fed into a refining area against the steam flow produced by the refining action. The aqueous wood chip solution delivered to the refiner is about 50% solids. The refiner typically has two metal plates where at least one of the plates is rotating at high speed. The speed of the inlet screw feed controls the production rate because it determines the amount of wood chips permitted to enter into the refining area. The refining area basically comprises two zones: 1.) a breaker bar zone and 2.) a developing zone. The breaker bar zone has a coarse segment characterized by wide bars and grooves and the developing zone has a dense segment characterized by narrower bars and grooves. In this breaker bar zone chips are broken down into coarse pulp between the eye of the refiner and the breaker bars. The refining area defibrates and fibrillates the pulp by the pressure that is present between the bars and dams of the refiner plates, as well as by the friction produced when contact is made with other fibers. Dilution water is then injected into the refiner area to decrease pulp solids to about 30%-40% at the refiner outlet. The dilution water serves to quench the steam that is produced, lower pulp consistency, lubricate, and modify the rheology of the pulp and fibers. The quenching effect may also prevent the pulp from burning (i.e. losing brightness). The energy consumed during the refining process is used to produce pulp and steam.

As used herein, the term "freeness" is meant to refer to the measurement of water drainage from pulp or the ability of a pulp and water mixture to release or retain water or drainage. Pulps having greater freeness values are characterized as being faster draining, coarser pulps. Freeness is typically reported as "ml CSF" (Canadian Standard Freeness). Freeness is dependent upon both the mechanical properties of the refiner and the physical properties of the wood chips. An operator may vary the parameters of the refiner such as plate gap, dilution water flow or feed screw speed depending on whether the process is in accordance with the freeness target. The freeness value may vary initially upon addition of the lubricant solution or the carrier/additive solution to the wood chips; however, the above-noted parameters may be changed to attain the desired freeness.

As used herein, the term "refining area" is meant to refer to the area within any refiner where wood chips are converted into pulp.

As used herein, the term "lubricant" is meant to refer to a substance(s) that is capable of lessening or preventing friction.

A "lubricant solution" is meant to refer to an aqueous solution comprising the lubricant(s); and "lubricant dosage" refers to the amount of lubricant(s) delivered to the wood chips.

As used herein, the term "carrier" is meant to refer to a fluid or material capable of transporting the frictionizer and allowing the frictionizer to be delivered to the wood chips.

As used herein, the term "frictionizer" is meant to refer to is any particulate material having a MOHS hardness that is greater than the wood with which it is used, and that can create friction between the refiner bars and the fibers or wood chips and between fibers and wood chips themselves. Moreover, the frictionizer should not completely dissolve or react upon exposure to the various components utilized during the pulping process.

A "carrier/frictionizer solution" is meant to refer to an aqueous solution comprising the carrier(s)/frictionizer(s); and "carrier/frictionizer dosage" refers to the amount of carrier(s)/frictionizer(s) delivered to the wood chips.

The present invention utilizes a lubricant solution, or alternatively, utilizes a carrier/frictionizer solution to increase the volumetric capacity of a refiner with respect to wood chips and/or reduce the specific energy consumption for a target freeness. More specifically, an embodiment of the process comprises:

(a1) applying, by soaking and/or spraying, a lubricant solution to an amount of wood chips prior to delivery into a refining area; or (a2) applying, by soaking and/or spraying, a carrier/frictionizer solution to an amount of wood chips prior to delivery into a refining area; and (b) delivering the wood chips to a refiner.

As noted above, an alternative embodiment of the present invention comprises (1) delivering an amount of wood chips to a refiner; and (2) applying, by soaking and/or spraying, a carrier/frictionizer solution to an amount of wood chips in the refining area. In this particular embodiment, the lubricant(s), carrier(s)/frictionizer(s), and amounts of use of each as well as the other described parameters remain consistent as described herein. This embodiment addresses the ability to alter the point of addition of the carrier(s)/frictionizer(s).

The embodiments of the process are applicable to papermaking processes utilizing either a batch or continuous production configuration. In either case, the lubricant solution or carrier/frictionizer solution should be evenly dispersed across the amount of wood chips. Furthermore, the present invention may be used with various types of atmospheric or pressurized mechanical pulping processes well known in the art such as, for example, Thermo Mechanical Pulping (TMP) in which the wood chips are subjected to heat, pressure, and mechanical shearing in a refiner; Refiner Mechanical Pulping (RMP); Chemi-Mechanical Pulping (CMP); and Chemi-Thermo Mechanical Pulping (CTMP).

An important aspect of increasing a refiner's rate of production involves increasing the volumetric flow of wood chips into as well as the volumetric capacity of the refining area. An increased production rate corresponds to an increased number of wood chips per unit volume that may enter into and flow through the refining area, over a given period of time. Without being bound by theory it is believed that the increased wood chip flow results from a more efficient packing of the wood chips with respect to one another, such that there are fewer void areas or steam pockets in the refiner screw. The lubricant solution may therefore behave as a chip lubricant and/or rheology modifier. The effect of more efficiently packing the wood chips may produce higher quality pulp by 1) allowing a more voluminous feed of wood chips to the refiner; and 2) providing a more uniform and predictable mechanical action on the pulp that will eventually result in fewer production swings.

According to the present invention, step (a1) involves applying a lubricant solution to an amount of wood chips by soaking and/or spraying the wood chips with the lubricant solution, wherein the solution contains about 0.04 wt-% to about 15 wt-% of lubricant, preferably about 0.06 wt-% to about 9 wt-%, more preferably about 0.06 wt-% to about 2 wt-%; and most preferably, the solution contains about 1.0 wt-% of lubricant.

The lubricant solution of step (a1) may be applied to the wood chips by any methods known in the art. Preferably, the lubricant solution is applied by soaking (including pre-soaking) the wood chips. The wood chips may be soaked via immersion of the wood chips in a bath containing the lubricant solution. Alternatively, the lubricant may be utilized in powder form, such that it may be added to the wood chips after the wood chips have been pre-soaked in water alone and subsequently drained, because there is enough water residue on the chips that the powder will make a lubricant solution. The wood chips may be soaked for a period of time ranging from about 1 second to about 10 minutes prior to their delivery into the refining area, preferably ranging from about 30 seconds to about 5 minutes, and more preferably the soaking time is about 1 minute. It will be recognized and understood by those skilled in the art that lubricant dosage is a critical factor, and thus, the soaking time will vary depending on the lubricant concentration in the solution, pulping process (e.g. temperature, pressure and the like), application process (e.g. spraying, soaking and the like), and wood chip characteristics (e.g. moisture content, density and the like). The lubricant dosage should be in the range of about 0.1 to about 6 pounds of lubricant per ton of wood chips, preferably ranging from about 0.25 to about 4 pounds of lubricant per ton of wood chips; and more preferably about 0.5 pounds of lubricant per ton of wood chips. Typically, the lubricant dosage is based on the amount of lubricant adsorbed to the wood chip, while a minimal amount of lubricant may also be absorbed into the wood chip. However the lubrication effect is caused by the adsorbed material.

Alternatively, in step (a1) the wood chips may be sprayed with the lubricant solution utilizing any conventionally known method in the art for the spray application of solutions such as, for example the Floodjet® spray nozzle system by Spraying System Co. Wheaton, Ill. For example, in typical methods, a spray nozzle can be used to shower the chips with the lubricant solution following the initial wood chip washing step just prior to delivery into the chip pre-heater. The application rate of the lubricant solution is dependent upon the wood chip flow rate and should be set to a rate that provides the necessary lubricant dosage to the wood chips. The lubricant dosage should be in the range of about 0.1 to about 6 pounds of lubricant per ton of wood chips, preferably ranging from about 0.25 to about 4 pounds of lubricant per ton of wood chips; more preferably about 0.5 pounds of lubricant per ton of wood chips. For example, application of a 0.25 wt-% lubricant solution to an amount of wood chips necessary for a production rate of about 20 tons per hour and having a lubricant dosage of about 0.5 pounds per ton, the application rate would be about 7.84 gallons per minute (20×0.5/0.25× 100/8.5 (water density in pounds per gallon)/60=7.84 gallons/minute), which provides for the necessary lubricant dosage by the wood chips.

Furthermore, the lubricant solution may be applied using a combination of both soaking and spraying techniques described above. When such a method is utilized, the required time for each aspect may vary according to the concentration of the lubricant solution, types of wood chips utilized and the like. However, the lubricant dosage should remain in the range of about 0.1 to about 6 pounds of lubricant per ton of chips, preferably ranging from about 0.25 to about 4 pounds of lubricant per ton of chips; and more preferably about 0.5 pounds of lubricant per ton of wood chips.

As noted above, the lubricant solution of step (a1) comprises cationic guar gum, cationic starch, cationic polyacrylamide, nonionic polyethylene oxide, mixtures of xanthan gum and at least one other lubricant (preferably cationic guar gum); and/or various combinations of different lubricants. When mixtures of various lubricants are utilized, each individual lubricant may be present in a weight ratio ranging from about 1:99 to about 99:1, more preferably ranging from about 1:4 to about 4:1, and most preferably the weight ratio is about 1:1.

Generally, guar gums used in accordance with step (a1) are galacto-mannans comprising a linear chain of beta-D-mannopyranosyl units linked with single membered alpha-D-galactopyranosyl units occurring as side branches, wherein these units are in a ratio of about 1:4, respectively. The embodiments of the present invention may use a copolymer of galactose and mannose resulting in the preferred cationic guar gum.

Guar gums may be rendered cationic by quaternization with quaternary amine compounds. Typical cationic guar gums have a general formula represented by: Guar-O—$C_2H_4N^+H_3$, wherein the oxygen molecule refers to the $CH_2OH$ reactive site.

Preferred cationic guar gums for use in the present invention have a number average molecular weight ranging from about 1 million to about 2 million, preferably ranging from about 1.7 million to about 1.9 million, and more preferably the number average molecular weight is about 1.8 million. An example of a preferred cationic guar gum includes, but is not limited to, guar hydroxypropyltrimonium chloride. An example of a commercially available cationic guar gum is Galactasol® SP 813S (available from Hercules Incorporated, Wilmington, Del.).

Cationic polyacrylamides comprise monomeric groups of acrylamide, (i.e., $CH=C[-CONH_2]-$, in which the bracketed group is attached to the second carbon). Cationic co-monomers typically have quaternary ammonium groups, and they are attached to the polymer chain by an amide $-CH=C[-CONH-RN^+(CH_3)_3]X^-$ or an ester $-CH=C[-COO-R-N^+(CH_3)_3]X^-$ where $R=(CH_2)_n$, and $n=0-8$, and $X^-$ is an anion (e.g., $Cl^-$, $Br^-$, or $SO_4^-$).

Preferred cationic polyacrylamides for use in the present invention have a number average molecular weight ranging from about 1 million to about 10 million, preferably about 3 million to about 8 million, and more preferably the number average molecular weight is about 5 million. Additionally the cationic polyacrylamides have a cationic charge density between about 5%-mol. and about 100%-mol., preferably about 7%-mol. to about 20%-mol., and more preferably the cationic charge density is about 10%-mol. An example of a commercially available cationic polyacrylamide includes, but is not limited to PerForm® 8713 (available from Hercules Incorporated, Wilmington, Del.).

Polyethylene oxides typically comprise ethylene oxide monomers comprising an epoxide ring, wherein the molecules typically also contains two $CH_2$ linkages and an oxygen atom. In the presence of a catalyst, the monomer forms a chain having the repeat unit $-CH_2-CH_2-O-$.

Preferred nonionic polyethylene oxides for use with the present invention have a number average molecular weight greater than or equal to 50,000, preferably in the range of about 500,000 to about 50 million, and more preferably the number average molecular weight is about 2 million. An example of a commercially available polyethylene oxide includes, but is not limited to, Polyox™ WSR 303 (available from Dow Chemical, Midland Mich.).

Starch is a repeating glucose unit, having a carbohydrate monomer composition of $C_6H_{12}O_6$. In the polymer each unit has three —OH groups, and the units are linked together with flexible alpha-1-4-glycocidic bonds. Cationic starch is produced by treating starch with a reagent such as epoxypropyltrimethylammonium chloride which contains a quaternary nitrogen, that is usually attached to the starch at the $C_6$ position.

Preferred cationic starch products for use in the present invention have a number average molecular weight in the range of about 1,000 to about 2 million, preferably a weight ranging from about 5,000 to about 20,000, and more preferably the number average molecular weight is about 10,000. Additionally the cationic starch has a charge density between about 0.15% and about 0.43% nitrogen, preferably a cationic charge density from about 0.30% to about 0.36% nitrogen, and more preferably the charge density is about 0.33%. Examples of commercially available cationic starches include, but are not limited to, a cationic corn starch such as National 3782A; a cationic waxy maze such as, for example, MicroCAT® 110; and a cationic potato starch such as, for example, Staloc 400 (all of which are available from National Starch Company, Indianapolis, Ind.).

Xathan gum is a high molecular weight polysaccharide produced by viscous fermentation. The polymer backbone is made up of β-1,4-linked D-glucose residues and, therefore, is identical to the cellulose molecule. A trisaccharide branch containing one glucuronic acid unit between two mannose units is linked to every other glucose unit at the number 3 position. Preferred xanthan gums have a molecular weight ranging from about 1 million to about 4 million, more preferably ranging from about 2 million to about 3 million, most preferably about 2 million.

An example of a suitable commercially available xanthan gum include, but are not limited to, Keizan RD (available from CP Kelco, Wilmington, Del.).

Mixtures of xanthan gum and at least one other lubricant (preferably cationic guar gum); and/or various combinations of different lubricants are preferably found in weight ratios ranging from about 10:1 to about 1:10, more preferably from about 5:1 to about 1:5, and most preferably at a weight ratio of about 1:1.

Another important aspect of pulp refining is the residence time that pulp or fibers spend in the refining area. A longer residence time in the refining area results in higher quality pulp than a shorter residence time, in accordance with the increased number of fiber/fiber and fiber/bar contacts. The energy distribution over a higher number of bar contacts is more efficient than the same energy distribution over a lesser number of bar contacts. The addition of a carrier/frictionizer solution increases the friction among the fibers as well as between the fibers and bar in the refining area. Thus, a short residence time in conjunction with the use of a carrier/frictionizer solution simulates the effects of a much longer residence time. The frictionizer is an abrasive material that is carried to the wood chips by the carrier solution. Once the wood chips are in the refiner, the carrier thins out and the frictionizer becomes available on the chip surface to act as an abrasive. Thus, the greater degree of friction conferred by the carrier/frictionizer solution allows for a reduction in the specific energy consumption for a freeness target.

According to the present invention, step (a2) involves applying a carrier/frictionizer solution to an amount of wood chips by soaking and/or spraying the wood chips with the carrier/frictionizer solution, wherein the solution contains about 0.04 wt-% to about 15 wt-% of the carrier, preferably the solution contains about 0.06 wt-% to about 9 wt-% of the carrier; more preferably about 0.06 wt-% to about 2 wt-%, most preferably, the solution contains about 0.5 wt-% of carrier (based on the total weight of the carrier/frictionizer solution).

Additionally the carrier/frictionizer solution contains about 0.3 wt-% to about 30 wt-% of the frictionizer, preferably about 0.3 wt-% to about 10 wt-%, more preferably about 1 wt-% to about 8 wt-%, and most preferably the solution contains about 3 wt-% of frictionizer (based on the total weight of the carrier/frictionizer solution). Optimally the carrier/frictionizer solution contains about 0.5 wt-% of a carrier and about 3 wt-% of frictionizer (based on the total weight of the carrier/frictionizer solution).

Preferably in the carrier/frictionizer solution, the carrier and frictionizer have a weight ratio of about 1:20 to about 1:3, preferably about 1:10 to about 1:5, and more preferably about 1:6, respectively.

The carrier/frictionizer solution of step (a2) may be applied to the wood chips by any known methods in the art. Preferably, the solution is applied by soaking (including pre-soaking) the wood chips. The wood chips may be soaked via immersion of the wood chips in a bath containing the carrier/frictionizer solution. Alternatively, the carrier and frictionizer may be utilized in powder form, such that they may be added to the wood chips after the wood chips have been pre-soaked in water alone and subsequently drained, because there is enough water residue on the chips that the powder will make a carrier/frictionizer solution. The wood chips may be soaked for a period of time ranging from about 1 second to about 10 minutes prior to their delivery into the refining area, preferably ranging from about 30 seconds to about 5 minutes, more preferably the soaking time is about 1 minute. It will be recognized and understood by those skilled in the art that the carrier and frictionizer dosage is a critical factor. The carrier/frictionizer dosage should be in the range of about 0.1 to about 10 pounds per ton of wood chips, preferably ranging from about 0.1 to about 6 pounds of carrier/frictionizer per ton of wood chips, more preferably ranging from about 0.25 to about 4 pounds of carrier/frictionizer per ton of wood chips, most preferably about 3.5 pounds of carrier/frictionizer per ton of wood chips.

Alternatively, in step (a2) the wood chips may be sprayed with the carrier/frictionizer solution before entering the refining area or at the refining area utilizing any conventionally known method in the art for the spray application of solutions such as those described above. For example, in typical methods, a spray nozzle can be used to shower the chips with the carrier/frictionizer solution in the screw feeder prior to entering the refiner. The application rate of the carrier/frictionizer solution is dependent upon the wood chip flow rate and should be set to a rate that provides the necessary carrier/frictionizer dosage to the wood chips. The carrier/frictionizer dosage should be in the range of about 0.1 to about 10 pounds per ton of wood chips, preferably ranging from about 0.1 to about 6 pounds of carrier/frictionizer per ton of wood chips, more preferably ranging from about 0.25 to about 4 pounds of carrier/frictionizer per ton of wood chips; most preferably about 3.5 pounds of carrier/frictionizer per ton of wood chips. For example, application of a 3.5 wt-% carrier/frictionizer solution to an amount of wood chips necessary for a production rate of about 20 tons per hour and having a carrier/frictionizer dosage of about 3.5 pounds per ton, the application rate would be about 3.9 gallons per minute (20×3.5/8.5 (water density in pounds per gallon)/60×100/3.5=3.9 gallons/minute), which provides for the necessary carrier/frictionizer dosage by the wood chips.

Furthermore, the carrier/frictionizer solution may be applied using a combination of both soaking and spraying techniques described above. When such a method is utilized, the required time for each aspect may vary according to the concentration of the carrier/frictionizer solution, types of wood chips utilized and the like. However, the carrier/frictionizer dosage should remain in the range of about 0.1 to about 10 pounds per ton of wood chips, preferably ranging from about 0.1 to about 6 pounds of carrier/frictionizer per ton of chips, more preferably ranging from about 0.25 to about 4 pounds of carrier/frictionizer per ton of chips; and most preferably about 3.5 pounds of carrier/frictionizer per ton of wood chips.

The carrier for use in step (a2) comprises cationic guar gum, anionic guar gum, nonionic guar gum, amphoteric guar gum, cationic starch, nonionic polyethylene oxide, cationic polyacrylamides, anionic polyacrylamides, nonionic polyacrylamides, xanthan gum, mixtures of xanthan gum and at least one other carrier (preferably one of cationic/nonionic/anionic/amphoteric guar gum); and other various combinations of the above-described carriers. Those carriers such as cationic guar, cationic starch, nonionic polyethylene oxide, cationic polyacrylamides and xanthan gum are the same as those described above, while the remaining carriers are set forth below. When mixtures are utilized, each individual carrier may be present in a weight ratio ranging from about 1:99 to about 99:1; more preferably ranging from about 1:4 to about 4:1, and most preferably the weight ratio is about 1:1.

Generally, guar gums used in accordance with step (a2) are galacto-mannans comprising a linear chain of beta-D-mannopyranosyl units linked with single membered alpha-D-galactopyranosyl units occurring as side branches, wherein these units are in a ratio of about 1:4, respectively. The embodiments of the present invention may use a copolymer of galactose and mannose resulting in the preferred anionic or non ionic guar gum.

Anionic and nonionic guar gums derivatives may be produced through etherification or esterification reactions through the hydroxyl functionalities of the galacto-mannose chain.

Preferred anionic and or nonionic guar gums for use in the present invention have a number average molecular weight ranging from about 1 million to about 2 million, preferably ranging from about 1.7 million to about 1.9 million, and more preferably the number average molecular weight is about 1.8 million. An example of a preferred anionic guar gum includes, but is not limited to, carboxymethylhydroxypropyl guar. An example of a commercially available anionic guar gum is Galactasol® 60H3FD (available from Hercules Incorporated, Wilmington, Del.). An example of a preferred nonionic guar gum includes, but is not limited to, guar gum. An example of a commercially available nonionic guar gum is Supercol® G2S (available from Hercules Incorporated, Wilmington, Del.).

Amphoteric guar gums comprise various mixtures of cationic and anionic guar gums. An example of a commercially available amphoteric guar gum is AQU D-3372 (available from Hercules Incorporated, Wilmington, Del.).

Anionic and nonionic polyacrylamides comprise monomers of acrylamide, (i.e., CH=C[—CONH$_2$]—, in which the bracketed group is attached to the second carbon). Anionic polyacrylamides typically have anionic co-monomer groups attached to the polymer chain. Such monomers include but are not limited to (methyl)acrylic acid and their salts, 2-acrylamido-2-methylpropane sulfonate, sulfoethyl-(meth)acrylate, vinylsulfonic acid, maleic or other dibasic acids or their salts or mixtures thereof. Nonionic polyacrylamides typically have nonionic co-monomer groups attached to the polymer chain. Nonionic monomers include but are not limited to (meth)acrylamide; N-alkyacrylamides, such as N-methylacrylamide; N,N-dialkylacrylamides, such as N,N-dimethylacrylamide; methyl acrylate; methyl methacrylate; acrylonitrile; vinyl acetate; N-vinyl pyrrolidone, and mixtures of any of the foregoing and the like.

Preferred anionic and nonionic polyacrylamides for use in the present invention have a number average molecular weight ranging from about 1 million to about 25 million, preferably about 2 million to about 24 million, and more preferably the number average molecular weight is about 3 to 23 million. Additionally the anionic carriers have an anionic charge density between about 0 and about 100%-mol., preferably about 1 to about 99%, and more preferably the anionic charge density is about 2 to 98 mol-%. An example of a commercially available anionic polyacrylamide includes, but is not limited to, Floerger AN910 (available from SNF Floerger, Riceboro, Ga.). An example of a commercially available nonionic polyacrylamide includes, but is not limited to, Floerger FA 920 (available from SNF Floerger, Riceboro, Ga.).

Preferred mixtures of xanthan gum and at least one other carrier (preferably one of cationic/nonionic/anionic/amphoteric guar gum) as well as mixtures of various carriers are found in weight ratios ranging from about 10:1 to about 1:10, more preferably from about 5:1 to about 1:5, and most preferably at a weight ratio of about 1:1.

The frictionizer particles in step (a2) should generally have a MOHS hardness (a hardness scale well known to those skilled in the art) ranging from about 1 to about 9, preferably ranging from about 2 to about 7, and more preferably from about 3 to about 6.

Examples of frictionizers include, but are not limited to, aluminum oxide, pumice, calcium metasilicate (e.g. wollastonite), nepheline syenite, silica, feldspar, aluminum trihydrate, glass beads, quartz, clay and various mixtures of such frictionizers. When mixtures are utilized, each individual frictionizer may be present in a weight ratio ranging from about 1:99 to about 99:1; more preferably ranging from about 1:4 to about 4:1, and most preferably the weight ratio is about 1:1.

The frictionizer particles typically have a particle size in the range of about 1 to about 200 microns, preferably ranging from about 50 microns to about 150 microns, and more preferably the particle size is about 70 microns in diameter.

An example of a commercially available frictionizer useful in the embodiments of the present invention includes, but is not limited to, aluminum oxide (40 micron, 75-76 micron or 102 micron and 9 MOHS hardness) available from KC Abrasives Company, LLC, Kansas City, Kans.; and 70-100 micron aluminum oxide available from Composition Materials, Milford Conn.

With respect to step (b), the wood chips may be delivered to the refiner either automatically by those methods known in the art or manually where the wood chips are placed into the refiner by the operator.

Typically, the residence time for wood chips in a refiner observed in the art is about 0.1 seconds to about 150 seconds, depending upon the type of wood chip, speed of the screw feeder, refiner plate gap and other relevant variables.

Generally, in the refining process the wet pulp material has a pH ranging from about 6.5 to about 9, and preferably from about 6.5 to about 7.5, both before and after the addition of the additive solution or the cationic guar gum/aluminum oxide solution.

EXAMPLES

The embodiments of the present invention are further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the claims.

Conditions and Procedures for Examples 1, 2, 3 and 4

Preparation of the Wood Chips

Fresh Southern Pine softwood chips from Georgia Pacific in Palatka, Fla. or Alabama River Newsprint in Monroeville, Ala., were double screened using a Sweco vibro separator (e.g. Sweco Vibro Energy Separator, Model Number LS 18S33, manufactured by SWECO, Incorporated, Florence Ky.). Chips size accepts were greater than ⅞ inch and less than 1 inch. Each refining batch used 2000 g A.D. chips (A.D. refers to ambient dried). Screened chip solids were determined for each batch. Individual chip batches were soaked in deionized water, lubricant solutions or carrier/frictionizer solutions in a 12 quart pot with a drainer at ambient temperature for 1 minute, followed by a drain time of 30 seconds.

Lubricant dosage or carrier/frictionizer dosage was determined by measuring the weight of the wood chips before the soaking period and the weight gain of the wood chips after the soaking period. For example, a 1000 gram O.D. sample of wood chips adsorbed about 400 grams of 0.0625% lubricant solution or carrier/frictionizer solution. Therefore, the dosage is calculated as: product solution (%)/wood chip oven dried weight (g)×solution dosage (g)×2000 (lbs)=pounds per ton of treatment.

The lubricants tested in the Examples included:
1.) Galactasol® SP 813S, a cationic guar gum (CGG) available from Hercules Incorporated, Wilmington, Del.;
2.) PerForm® 8713, a cationic polyacrylamaide (CPAM) available from Hercules Incorporated, Wilmington, Del.;
3.) MicroCAT® 110, a cationic waxy maze (CWM) available from National Starch Company, Indianapolis, Ind.;
4.) Staloc 400, a cationic potato starch (CPS) available from National Starch Company, Indianapolis, Ind.;
5.) Polyox™ WSR 303, a polyethylene oxide (PEO) available from Dow chemical, Midland, Mich.; and
6.) Approx. 75-76 micron (200 mesh) and 102 micron (150 mesh) aluminum oxide particles (AO) available from Fisher Scientific.
7.) Kelzan RD, a xanthan gum (XG) available from CP Kelco, Wilmington, Del.
8.) National 3782A, charge density of 0.30-0.36% nitrogen, a cationic corn starch (CCS), available from National Starch and Chemical Company, Indianapolis, Ind.

The carrier tested in the Examples included Galactasol® SP 813S, a cationic guar gum (CGG) available from Hercules Incorporated, Wilmington, Del.

The frictionizers tested in the Examples included:
1.) Approx. 75-76 micron and 102 micron aluminum oxide particles (AO) available from Fisher Scientific;
2.) Pumice available from AGSCO Corporation, Wheeling, Ill., Pumice 0-½.
3.) Calcium metasilicate, Wollastonite 915U, available from Fibertec, Bridgewater, Mass.
4.) Nepheline syenite available from AGSCO Corporation, Wheeling, Ill., as Nepheline Syenite #50

Refining Procedure

The chips were manually placed into a refiner vertical feed chute by the operator, the lid bolts were secured and the chute was pressurized with steam at a temperature of 125° C. for 3 minutes. The steam was injected directly into the chamber.

Table 1 describes the refiner parameters utilized for Examples 1, 2, 3, and 4 unless otherwise noted.

TABLE 1

| Dilution Flow (mL/second or mL/s)* | 12.0 |
|---|---|
| Plate Gap (millimeters)** | 0.20 |
| Infeed Screw Speed (rpm)*** | 650 |
| Upper Feed Pressure (psig) | 14 |
| Lower Discharge Pressure (psig) | 7 |

*In Table 2, Controls 1 and 2 had a dilution flow of 10.5 mL/s.
*The plate gap measurement is an average value, which ranged from about 0.17 to about 0.22. In Example 4, the plate gap was 0.17 and for Control 2, the plate gap was 0.22.
***Control 5 had an infeed screw speed of 452 rpm's.

The refiner base load power demand (in Kilowatts) (the refiner power demand when no wood chips were being fed into it) was recorded after pre-steaming using a lap-top computer. The feed screw was started and an immediate supply of wood chips was provided to the refining area. The refining energy per metric ton (i.e. Net Specific Energy in kW*Hr/MT) was monitored and recorded as the chips were fed into the refiner. The time the refiner took to return to the base load power demand level, which involves the passage of all chips that were in the feed chamber or the residence time of all chips, was also measured. The feed screw was stopped and the refiner was shut down. The production rate was determined using the oven dried (O.D.) chip weight divided by the base load to base load power time measurement (in minutes). A shorter time span from base load to base load conditions using the same quantity of wood chips indicates a higher production rate.

The refined pulp was collected from the discharge vessel at the end of each run. Accept pulp consistency was measured and the pulp was latency treated before the Canadian Standard Freeness (CSF) was tested. The CSF measures the drainage characteristics of the pulp. The energy input is adjusted in most mechanical pulping operations to maintain the pulp freeness within a narrow range.

Example 1

The lubricant tested in this example was the cationic guar gum (CGG). The soaking solution was either a 0.25% aqueous cationic guar gum solution or a 0.5% aqueous cationic guar gum solution as noted in Table 2. The lubricant dosage was based on the O.D. fiber weight. Control runs involved soaking the wood chips in only deionized water.

TABLE 2

KRK Refiner Runs having Soaked Wood Chips

| Lubricant | Lubricant Dosage (lbs/ton) | Production Rate (OD g/min) | Net Specific Energy (kW * Hr/MT) | Freeness (mL CSF) |
|---|---|---|---|---|
| Control 1 | | 287 | 704 | 487 |
| Control 2 | | 281 | 823 | 380 |
| Control 3 | | 295 | 743 | 457 |
| Control 4 | | 282 | 894 | 374 |
| Control 5 | | 289 | 678 | 512 |
| Control 6 | | 265 | 689 | 457 |
| CGG (0.25%-wt) | 1.5 | 343 | 750 | 520 |
| CGG (0.25%-wt) | 1.5 | 363 | 960 | 326 |
| CGG (0.5%-wt) | 3.0 | 343 | 1047 | 335 |

Table 2 shows that soaking the wood chips in a cationic guar gum solution increased the production rate of the refiner from an average of about 283 g/minute to about 350 g/minute. The increased production rate correlated to an increased power demand with a consequent decrease in freeness. Thus, the data shows that the relation between specific energy and freeness was not affected.

The increase of the cationic guar gum concentration in the soaking solution from 0.25% to 0.5% did not result in a noticeable change in the production rate.

The results from Table 2 indicate that a process involving soaking the wood chips in a cationic guar gum solution prior to entering the refining area increased the production rate.

Example 2

The lubricants tested in this example included cationic guar gum (CGG); cationic polyacrylamaide (CPAM), cationic waxy maze (CWM), cationic potato starch (CPS), polyethylene oxide (PEO); xanthan gum (XG) alone as well as in combination with cationic guar gum; as well as 200 mesh screen aluminum oxide particles (AO) (available from Fisher Scientific) alone and in combination with the cationic guar gum

TABLE 3

KRK Refiner Production Rates

| Lubricant | Production Dilution (wt-%) | Lubricant Dosage (lb/Ton) | Production Rate (OD g/min) | Production Rate Change (%) |
|---|---|---|---|---|
| Control 7 | 0 | 0 | 342 | |
| Control 8 | 0 | 0 | 335 | |
| Control 9 | 0 | 0 | 324 | |
| CGG | 0.125 | 0.94 | 382 | 14.37 |
| CGG | 0.125 | 0.95 | 382 | 14.37 |
| CGG | 0.25 | 2.24 | 400 | 19.76 |
| CPAM | 0.0625 | 0.50 | 387 | 15.87 |
| CPAM | 0.0625 | 0.48 | 422 | 26.35 |
| CWM | 0.125 | 0.96 | 382 | 14.37 |
| CWM | 0.25 | 2.43 | 377 | 12.87 |
| PEO | 0.0625 | 0.42 | 416 | 24.55 |
| CGG + XG | 0.0625 + 0.0625 | 1.47 | 408 | 22.16 |
| XG | 0.125 | 1.24 | 317 | −5.09 |
| CPS | 0.25 | 1.87 | 357 | 6.99 |

The results in Table 3 show that all of the lubricants significantly increased the refiner's production rate as compared to the Control samples. The combination of cationic guar gum (CGG) and xanthan (XG) was used at a 1:1 ratio and produced a production rate increase greater than that where xanthan gum was applied individually.

Additionally, a cationic guar gum/aluminum oxide solution was run to verify the effect of friction on energy reduction.

TABLE 4

KRK Refiner Energy Reduction

| Description | Conc. (wt-%) | Lubricant Dosage (lb/Ton) | Production Rate Increase (%) | Specific Energy Change (%) |
|---|---|---|---|---|
| AO | 0.5 | 3.67 | 0.90 | +17.0 |
| CGG + AO | 0.125 + 0.5 | missed | 20.36 | −24.1 |

Table 4 shows that the addition of cationic guar gum with aluminum oxide decreases specific energy consumption by about 24%. Aluminum oxide alone seemed to have a detrimental effect on specific energy, in that the specific energy increased. The calculation of the energy reduction was based on the comparison of the actual specific energy values to the specific energy obtained from a regression analysis of all runs. The results shown in Table 4 were generated at the same time as those in Table 3; therefore the same Control results are applicable for comparison.

Example 3

This example tested a cationic guar gum (CGG); a cationic corn starch (CCS); as well as an aluminum oxide (AO) and cationic guar gum solution. In the CGG+AO runs, the cationic guar gum/aluminum oxide solution was first prepared and then applied to the wood chips.

A linear regression analysis on all the data was performed to define the freeness/energy relationship. The actual specific energy values were compared to the linear regression specific energy values. A lower value as compared to the regression data indicates a reduction in specific energy (i.e. negative number). A higher value as compared to the regression data indicates an increase in specific energy (i.e. positive number).

TABLE 5

KRK Refiner Production Rates

| Lubricant | Lubricant Dilution (%-wt) | Lubricant Dosage (lb/Ton) | Net Specific Energy (kW * Hr/MT) | Freeness (mL CSF) | Production Rate (OD g/min) | Production Rate Increase (%) | Specific Energy Change (%) |
|---|---|---|---|---|---|---|---|
| Control 10 | 0 | 0 | 561 | 670 | 315.4 | 0.5 | +3.7 |
| Control 11 | 0 | 0 | 608 | 617 | 317.4 | 1.1 | −2.9 |
| Control 12 | 0 | 0 | 493 | 699 | 303.0 | −3.5 | −0.3 |
| Control 13 | 0 | 0 | 763 | 527 | 331.1 | 5.5 | −1.1 |
| Control 14 | 0 | 0 | 863 | 475 | 303.0 | −3.5 | +1.0 |
| CGG | 0.125 | Missed | 571 | 676 | 373.1 | 18.6 | +7.5 |
| CCS | 0.125 | 0.89 | 757 | 489 | 342.2 | 9.1 | −9.1 |
| CGG + AO*# | 1 + 2 | 2 + 4 | 669 | 579 | 403.2 | 28.2 | −2.7 |
| CGG + AO*# | 1 + 3 | 2 + 6 | 813 | 419 | 399.9 | 27.3 | −14.0 |
| CGG + AO* | 0.125 + 0.5 | Missed | 680 | 546 | 396.8 | 26.5 | −8.2 |
| CGG + AO*# | 1.1 + 5.5 | 2.2 + 11 | 753 | 502 | 381.6 | 21.6 | −7.2 |
| CGG + AO* | 0.125 + 0.5 | 0.53 + 2.1 | 665 | 525 | 357.1 | 13.7 | −14.1 |
| CGG + AO* | 0.125 + 0.5 | 0.45 + 1.8 | 624 | 602 | 384.6 | 22.4 | −4.1 |
| CGG + AO*# | 1 + 4 | 1.1 + 4.4 | 738 | 524 | 380.2 | 20.9 | −4.9 |
| CGG + AO* | 0.125 + 0.5 | 1.32 + 5.28 | 622 | 626 | 403.2 | 28.2 | −1.7 |
| CGG + AO*# | 0.9 + 9 | 1 + 22 | 728 | 506 | 384.6 | 22.4 | −9.6 |
| CGG + AO*# | 0.9 + 9 | 1 + 22 | 672 | 540 | 387.5 | 23.2 | −10.4 |
| CGG + 102μ AO# | 1 + 3 | 2 + 6 | 645 | 602 | 399.9 | 27.3 | −0.8 |
| CGG + 102μ AO | 0.125 + 0.5 | 1.32 + 5.28 | 622 | 594 | 374.5 | 19.4 | −6.2 |

*indicates the use of 200 mesh aluminum oxide;
indicates the cationic guar gum/aluminum oxide were applied directly to the chips;
"102μ" indicates the particle size of the aluminum oxide.

Results from Table 5 indicate that a cationic guar gum solution in combination with aluminum oxide increased the refiner's production rate and/or reduced specific energy as compared to the Control. In addition, although the cationic corn starch only slightly increased production rate, it had a large impact on reducing specific energy without the aluminum oxide.

Example 4

This example tested a cationic guar gum (CGG) in combination with pumice type 0-½ (PO), calcium metasilicate (CS), nepheline syenite (NS), or aluminum oxide (AO). Product application and data analysis are identical to those methods used in Example 3.

TABLE 6

KRK Refiner Energy Reduction

| Lubricant | Lubricant Dilution (%-wt) | Net Specific Energy (kW * Hr/MT) | Freeness (mL CSF) | Freeness Predicted (mL CSF) | Specific Energy Decrease (%) |
|---|---|---|---|---|---|
| Control 15 | 0 | 550 | 676 | 706 | −4.3 |
| Control 16 | 0 | 783 | 505 | 508 | +0.7 |
| Control 17 | 0 | 905 | 407 | 405 | +0.5 |
| Control 18 | 0 | 838 | 451 | 462 | −2.3 |
| Control 19 | 0 | 664 | 592 | 609 | −2.9 |
| Control 20 | 0 | 857 | 441 | 446 | −1 |
| Control 21 | 0 | 883 | 458 | 424 | −+8.1 |
| CGG + AO | 0.5 + 0.15 | 706 | 500 | 574 | −12.9 |
| CGG + AO | 0.5 + 0.15 | 891 | 357 | 417 | −14.3 |
| CGG + PO | 0.5 + 0.15 | 820 | 456 | 477 | −4.4 |
| CGG + PO | 0.5 + 0.15 | 936 | 339 | 379 | −10.5 |
| CGG + PO | 0.5 + 0.15 | 757 | 513 | 531 | −3.3 |
| CGG + CS | 0.5 + 0.15 | 976 | 313 | 345 | −9.2 |
| CGG + CS | 0.5 + 0.15 | 826 | 458 | 472 | −3.0 |
| CGG + NS | 0.5 + 0.15 | 488 | 413 | 419 | −1.5 |

Table 6 shows that the cationic guar gum in combination with aluminum oxide (CGG+AO) reduced specific energy an average of 13.6%. Additionally both the cationic guar gum plus pumice (CGG+PO) and cationic guar gum plus calcium metasilicate (CGG+CS) reduced specific energy an average of 6.1%.

Example 5

A trial was run in a TMP mill with Galactosol SP 813 S (cationic guar gum). The product was applied to the preheater feed screw conveyor as a 1% solution at 0.5 lb/ton. Results indicated that production was increased by 9%. No significant change was observed in the specific energy and freeness relationship.

Example 6

A trial was run in a TMP mill with Galactasol SP 813 S or GPX 315 (cationic guars available from Hercules, Inc., Wilmington, Del.) with aluminum oxide. The product combinations were added to the feed screw at 0.5 to 0.6 lb/ton cationic guar and 2 to 3 lb/ton aluminum oxide. Results indicated that energy was reduced by a minimum of 10% at the freeness target (see Table 7).

TABLE 7

Energy Savings

| | Pre-Trial | Trial | % Difference |
|---|---|---|---|
| Freeness (mL) | 264 | 264 | 0 |
| Specific Energy[1] (kW * Hr/MT) | 2389 | 2107 | −10.1 |

[1]Indicates primary and secondary refiner specific energy

Example 7

A trial was run in a TMP mill with Galactasol GPX 315 (cationic guar available from Hercules, Inc., Wilmington, Del.) with pumice (available from AGSCO Corporation, Wheeling, Ill.). The product combinations were added to the feed screw at 0.4 lb/ton cationic guar and 4 lb/ton pumice. Results indicated that energy was reduced by 5.7% in addition to lowering freeness by 7.5% (See Table 8).

TABLE 8

Energy savings

| Average Values | Pre-Trial | Trial 4 lb/ton | % Difference |
|---|---|---|---|
| PQM Freeness (mL) | 252 | 233 | −7.5 |
| Specific Energy[1] (KW * Hr/MT) | 2210 | 2084 | −5.7 |

[1]Indicates primary and secondary refiner specific energy

What is claimed is:

1. A process for increasing the production rate and/or reducing specific energy of a refiner for a freeness target comprising: (a1) applying a lubricant solution to an amount of wood chips prior to delivery into a refining area; and (b) delivering the wood chips to a refiner, wherein the wood chips of step (a1) have a lubricant dosage of from about 0.1 to about 6 pounds of lubricant per ton of wood chips after application of the lubricant solution.

2. The process according to claim 1, wherein the lubricant solution in step (a1) is applied to the wood chips by soaking, spraying or a combination thereof.

3. The process according to claim 2, wherein the wood chips of step (a1) are soaked for a period ranging from about 1 second to about 10 minutes.

4. The process according to claim 3, wherein the wood chips of step (a1) are soaked for about 30 seconds to about 5 minutes.

5. The process according to claim 4, wherein the wood chips of step (a1) are soaked for about 1 minute.

6. The process according to claim 1, wherein the lubricant solution in step (a1) is selected from the group consisting of cationic guar gum, cationic starch, cationic polyacrylamide, nonionic polyethylene oxide, mixtures of xanthan gum and at least one other lubricant; and mixtures thereof.

7. The process according to claim 6, wherein the lubricant solution in step (a1) comprises cationic guar gum.

8. The process according to claim 6, wherein the mixtures of xanthan gum and at least one other lubricant are in a weight ratio ranging from about 10:1 to about 1:10.

9. The process according to claim 8, wherein the weight ratio ranges from about 5:1 to about 1:5.

10. The process according to claim 9, wherein the weight ratio is about 1:1.

11. The process according to claim 1, wherein the lubricant solution in step (a1) contains about 0.04 wt-% to about 15 wt-% of a lubricant.

12. The process according to claim 11, wherein the lubricant solution in step (a1) contains about 0.06 wt-% to about 9 wt-% of the lubricant.

13. The process according to claim 12, wherein the lubricant solution in step (a1) contains about 0.06 wt-% to about 2 wt-% of the lubricant.

14. The process according to claim 13, wherein the lubricant solution in step (a1) contains about 1.0 wt-% of the lubricant.

15. The process according to claim 1, wherein the lubricant dosage ranges from about 0.25 to about 4 pounds of lubricant per ton of wood chips after application of the lubricant solution.

16. The process according to claim 15, wherein the lubricant dosage ranges from about 0.5 pounds of lubricant per ton of wood chips after application of the lubricant solution.

* * * * *